United States Patent [19]

Paju

[11] Patent Number: 5,478,440
[45] Date of Patent: Dec. 26, 1995

[54] METHOD AND APPARATUS FOR IMPROVING THE SAFETY OF A SPENT LIQUOR RECOVERY BOILER

[75] Inventor: Raimo Paju, Varkaus, Finland

[73] Assignee: A. Ahlstrom Corporation, Noormarkku, Finland

[21] Appl. No.: 290,707

[22] PCT Filed: Feb. 17, 1993

[86] PCT No.: PCT/FI93/00051

§ 371 Date: Aug. 12, 1994

§ 102(e) Date: Aug. 12, 1994

[87] PCT Pub. No.: WO93/17179

PCT Pub. Date: Sep. 2, 1993

[30] Foreign Application Priority Data

Feb. 19, 1992 [FI] Finland .................................. 920706

[51] Int. Cl.⁶ ........................................ D21C 11/12
[52] U.S. Cl. ........................... 162/30.1; 162/29; 162/47; 162/375; 110/238; 122/7 R
[58] Field of Search ................... 162/29.0, 30.1, 162/375, 47; 422/185; 110/180, 238; 122/7 R

[56] References Cited

U.S. PATENT DOCUMENTS 2,161,110  6/1939  Tomlinson et al. .................... 23/48
3,867,251  2/1975  Holme .................................. 162/30

FOREIGN PATENT DOCUMENTS 808263  7/1951  Germany.
928358  5/1955  Germany.

OTHER PUBLICATIONS

Pu, "Chemical Recovery Overview in Chinese Pulp and Paper Industry", 1989 Chemical Recovery, pp. 257–262.

Primary Examiner—Peter Chin
Assistant Examiner—Dean T. Nguyen
Attorney, Agent, or Firm—Nixon & Vanderhye

[57] ABSTRACT

The invention relates to a method and apparatus for use in the pulp industry for improving the safety of a spent liquor recovery boiler, such as a soda recovery boiler. The boiler comprises, for recovering chemical and energy, a furnace cooled by water tubes and connected to the water/steam circulation system of the boiler, the cooling of the bottom of the furnace being provided by a separate cooling circulation. The separately cooled lower section of the furnace is provided by separating the bottom or the bottom and part of the furnace walls from the boiler water circulation system. This separated section is supplied with a cooling fluid of its own which may be a gas (e.g. air or inert gas) or a liquid (e.g. molten zinc) which does not cause an explosion of it contacts the melt of the furnace.

20 Claims, 3 Drawing Sheets

METHOD AND APPARATUS FOR IMPROVING THE SAFETY OF A SPENT LIQUOR RECOVERY BOILER

BACKGROUND AND SUMMARY OF THE INVENTION

The present invention relates to a method and apparatus for use in the pulp industry for improving the safety of a spent liquor recovery boiler, such as a soda recovery boiler, whereby the boiler comprises, for recovering chemicals and energy, a furnace cooled by water tubes and connected to the water/steam circulation system of the boiler.

Recovery and regeneration of cooking chemicals effected in the soda recovery boiler are an essential part of sulphate and other Na-based pulp manufacturing processes. Organic substances dissolved in the spent liquor are combusted thereby generating heat which is utilized on one hand, when converting the inorganic compounds contained in the spent liquor back to chemicals to be used in cooking and on the other hand when generating steam. The inorganic matter, i.e., ash, contained in the spent liquor, melts at the high temperature prevailing in the soda recovery boiler and flows as melt downwardly onto the bottom of the furnace and further out of the boiler into a dissolving tank. The soda recovery boiler also serves as a steam boiler, where heat released during combustion is recovered as steam, primarily by water tubes lining the boiler walls, and as high-pressure superheated steam of, e.g. 450° to 480° C./65 to 85 bar, by superheaters disposed in the upper section of the boiler. The temperature rises very high, often to over 1000° inside the furnace of the soda recovery boiler, whereby the conditions in the furnace are highly corroding due to the temperature and the alkali and sulphur compounds contained in the spent liquor.

These special circumstances set constructive demands on the structure of the soda recovery boiler, such demands being different from those set on conventional power plant boilers. In the furnace structures presently used, the whole bottom and walls of the furnace are water-cooled in order to prevent the temperature at the tubes from rising to a level favourable for corrosion.

The bottom and wall tubes nowadays used in soda recovery boilers are usually of gas-tight welded membrane structure, where the tubes are welded together through fins. The fin width is usually 10 to 25 mm. The outer diameter of the tubes is generally 57 to 70 mm. In boilers of another type, the tubes are welded together side by side as a tangential structure with no large spaces therebetween. The furnace has been made gas-tight by welding the tubes together.

The boiler water, which is often highly pressurized and has a temperature of over 300° C., is usually led below the bottom of the furnace, wherefrom it is distributed to the tubes of the bottom and the wall. In the bottom tubes, the water first flows towards the walls and further upwardly therefrom. In the wall tubes, the water normally flows only upwardly.

The water circulation system of the soda recovery boiler functions by natural circulation. Proper water circulation is of a crucial importance to the operational safety of the boiler. If the water circulation is disturbed, it may result in overheating of the tube material, and consequently corrosion and tube damage. Great changes in the tube temperature as well as in the deposits of chemicals and ashes covering the tubes may cause disturbances in the water circulation. Especially in the bottom tubes, where water flows horizontally or nearly horizontally, a disturbance in the water circulation may be fatal.

A bed is formed on the bottom of the furnace, composed of material remaining in the spent liquor after the evaporable and easily combustible substances have been discharged during the pyrolysis stage. The bed contains, e.g., coal/coke, sodium and sulphur. The amount of the bed mass varies depending on process conditions. On the bottom of the bed, near the bottom tubes of the furnace, there is a layer of melt formed of inorganic chemicals. This layer of melt flows out of the furnace through an opening or openings in the furnace wall.

The lowermost portion of the layer of chemicals, which is in direct contact with the water-cooled bottom tubes of the furnace, is normally in a solid state due to the cooling effect of the tubes. This solid layer protects the tubes.

Formation of the solid layer onto the bottom of the furnace may be disturbed by temperature variation in the furnace, shallowness of the bed, unfavourable inclination of the bottom of the furnace or by poor cooling effect of the boiler tubes. There may be also other reasons why a solid layer of chemicals is not formed, which causes the danger of the bottom tubes of the furnace becoming overheated.

In some cases, the state of the layer nearest to the tubes varies between solid and molten states, Depending on the structure of the lower section and bottom of the boiler furnace or on combustion conditions, the conditions on the tubes may vary, whereby the cubes are sometimes covered by a solid and sometimes by a molten layer of chemicals, and sometimes at least a portion of them is totally without any protecting layer thereon.

For reasons described above, the bottom tubes of the boiler may be damaged. For example, fractures or cracks may appear, wherethrough water then finds it way and leaks out of the tubes into the chemical melt. This brings about a danger of a violent explosion between water and melt, i.e., a melt explosion. Such explosions sometimes occur and material damages may rise to millions of Finnmarks. Repairs of the damages may take months, which results in considerable production losses. Sometimes melt explosions have also claimed human lives.

A leak in furnace tubes may be caused by overheating as mentioned above, or by corrosion by chemicals, internal stresses in the tube material, fatigue of material or a combination of these, or for some other reason.

Because of the danger of explosion, the bottom tubes of the boiler have to be inspected frequently in order to discover in good time whether the bottom tubes have corroded or otherwise damaged and whether they therefore have to be partly or completely replaced or repaired.

Efforts have been made to decrease the danger of damage and explosion by using tube material which better resists corrosion, or by covering the bottom tubes by refractory material or coating them by corrosion resistant metal to be sprayed on the tubes. The bottom tubes used in soda recovery boilers are generally, for example, carbon steel tubes or compound tubes. The compound tube is made of carbon steel and coated with a thin, protective layer of austenitic steel. However, the danger of explosion or other damage has not been completely avoided. Inspections of boilers have revealed cracks and signs of corrosion also under the coating material. Unfortunately, the inspection itself may contribute to a damage to the tubes because the protective layer coating the tubes has to be removed for the time of inspection.

An object of the present invention is to provide a better method and apparatus than those described above for improving the safety of a recovery boiler.

Primarily, it is an object of the present invention to provide a structure forming the lower section of a recovery boiler furnace, which structure is not inclined to cause a melt/water explosion in case of damage.

It is a still further object of the present invention to provide a structure forming the lower section of the recovery boiler furnace, which is easier and faster to replace.

For achieving the objects mentioned hereinabove, it is a characteristic feature of the method of the present invention that cooling of the furnace bottom is provided by a separate cooling circulation system.

Correspondingly, it is a characteristic feature of the apparatus according to the invention that said apparatus comprises a furnace bottom formed of cooling tubes or cooling surfaces connected to a separate cooling circulation system.

The separate cooling of the lower section of the furnace may be limited to, e.g., the bottom level of the furnace but it may also partly extend to the wall section or wall sections of the furnace.

When cooling of the bottom of the soda recovery boiler is arranged by using a cooling circulation system separate from the boiler water/steam circulation system, it is possible to use cooling mediums other than water, for example, air, other inert gas or some fluid material such as molten zinc.

A separately cooled lower section of the furnace according to the invention is provided, e.g., so that the furnace bottom or the furnace bottom and part of the furnace walls together are separated from the boiler water circulation system. This separate section employs a cooling medium of its own, which may be some gas or liquid, which does not cause an explosion should it come into contact with furnace chemicals.

According to a preferred embodiment of this invention, a separately cooled lower section of the furnace may be constructed of tubes similar or nearly similar to those used for conventional, presently used furnace bottoms. Circulation of the cooling medium in the separately cooled bottom may be arranged so that the medium is supplied into the cooling tubes from the tube end at one wall of the furnace, wherefrom it then flows via the tubes to the tube end at the opposite wall. Thereafter, the medium is discharged via circulation pipes, circulation pipe or channel. From a separate circulation piping, the cooling medium is led preferably by a pump or a blower via a separate cooler back to the starting end of the cooling tubes.

A separately cooled lower section of the furnace may also be constructed of tubes larger or smaller than the tubes in the furnace itself or alternatively of tubes or canals, the cross section of which is square or rectangular.

It is also possible to lead the cooling medium from more than one side to the cooling tube section of the bottom. Several alternative circulation or flow arrangements of the cooling medium are possible in the lower section of the furnace by arranging the tubes in a suitable manner.

The cooling medium may be led, for example, to the main distribution chamber and/or distribution chambers in the center of the bottom or to some other place between the wall and the center of the bottom, wherefrom the cooling medium is then distributed over the entire bottom section.

The temperature of the medium flowing in the separately cooled lower section of the furnace is maintained relatively constant by regulating the cooling effect of the cooler disposed in the circulation piping. The temperature of the cooling medium flowing in the separate cooling circulation system according to the invention is preferably controlled so that it causes the thermal expansion of the separately cooled lower section of the furnace to correlate with the thermal expansion of the pressurized furnace having water circulation, i.e, no sealing problems exist between the separately cooled lower section of the furnace and the other furnace structure and no gas or chemical leakages occur between the parts of the apparatus.

The arrangement of the invention provides a boiler bottom structure which does not cause an explosion if a tube damage occurs and cooling medium comes into contact with the chemical melt inside the furnace.

A further advantage of the arrangement for separate cooling is that the separate cooling tubes of the lower section of the furnace are partly or completely replaceable separately so that the actual boiler water circulation pipes need not be touched.

In accordance with the invention, a still further advantage is gained, which comprises that the cooler disposed in the circulation piping may be advantageously used for preheating of the combustion air to be supplied to the boiler. On the other hand, if air is used as a cooling medium, the air heated in the cooling circulation system may be directly used as combustion air in the furnace.

BRIEF DESCRIPTION OF THE DRAWINGS

The invention is further described in the following, by way of example, with reference to the accompanying drawings, in which.

DETAILED DESCRIPTION OF THE DRAWINGS

Figure 1:
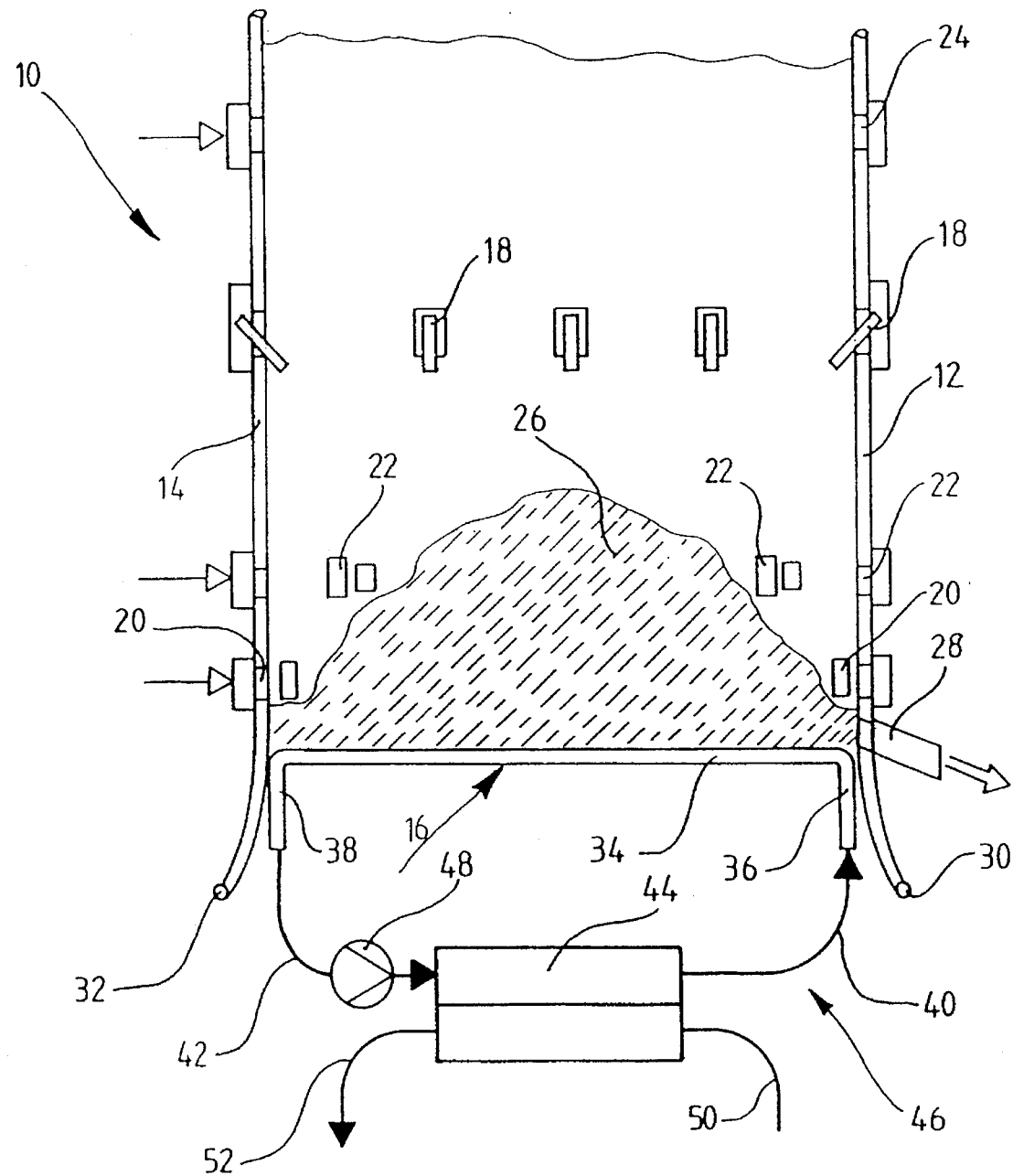
FIG. 1 is a schematic vertical section of a recovery boiler furnace having a bottom arrangement according to the invention.

FIG. 1 illustrates a furnace 10 of a soda recovery boiler, which furnace has water walls. Two of said water walls, 12 and 14, are shown in the Figure. The furnace also has a bottom 16, liquor nozzles 18, primary air inlets 20, secondary air inlets 22 and tertiary air inlets 24. A bed 26 of spent liquor pyrolysis waste has been formed on the bottom of the furnace during combustion. The lower section of the wall 12 is provided with a melt spout 28 for leading the chemical melt formed in combustion out of the furnace. The bottom 16 is slightly inclined in order to contribute to the melt flow. The bottom may be completely inclined, completely horizontal or partly both.

The water walls 12, 14 of the furnace are made of membrane tube panels, where adjacent water tubes are gas-tightly welded together through fins. The fins are not shown in the Figure. The water wall tubes are vertically arranged and they extend a little below the horizontal plane of the furnace bottom. The lower ends of the tubes are connected to each other by a distribution chamber 30 and 32. The water tubes, distribution chamber and headers combining the upper ends of the water tubes as well as the steam drum of the boiler, not shown in the Figure, are connected to the boiler to form a water/steam circulation system. Water flows from the distribution chambers 30 and 32 to the water tubes of water walls 12 and 14, where the water evaporates. The water/steam mixture thereby formed flows upwardly to the headers and further into the steam drum. From the steam drum, the steam is fed to superheaters and the water separated from the steam flows via discharge pipes back to the distribution chambers and further to the recirculation.

The furnace bottom 16 is made of cooling tubes connected to a separate cooling circulation system, which is not in communication with the boiler water/steam circulation. The bottom is comprised of cooling tubes 34, which are combined either through fins in the same way as the furnace wall panels or tangentially without fins, to form cooling pipe panels. The cooling tubes run parallelly with one furnace wall perpendicularly from wall 12 to wall 14.

The ends 36 and 38 of the cooling tubes of the furnace bottom are bent downwardly so that they run a little way downwardly mainly parallelly with the water tubes 12 and 14 of the furnace wall. The tube end 36 is connected to a cooling medium supply pipe 40 and the tube end 38 to a cooling medium discharge pipe 42. The pipes 40 and 42 are in communication with each other through a cooling chamber 44. In this manner, the tube 34 and pipes 40 and 42 of the furnace bottom 16 as well as the cooling chamber 44 form a separate cooling circulation system 46 on the furnace bottom. Cooling medium is circulated in the system by means of a pump or a blower 48. The cooling chamber is connected with a cooling medium supply pipe 50 and a cooling medium discharge pipe 52. The cooling medium may be air, other inert gas, some aqueous solution or liquid, which do not cause an explosion if they come into contact with chemical melt.

Figure 2:
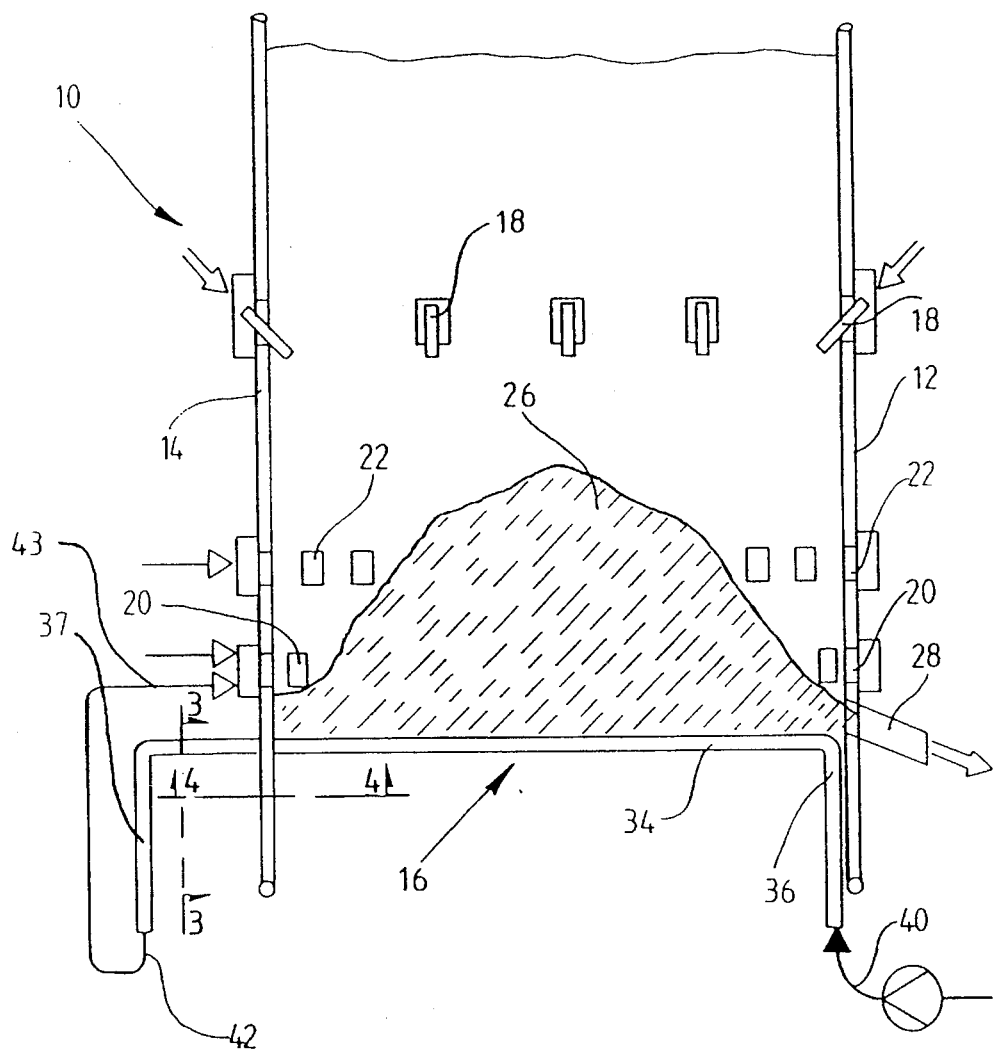
FIG. 2 is a schematic vertical section of a second bottom arrangement according to the invention.

FIG. 2 illustrates a slightly different furnace bottom arrangement in a soda recovery boiler. Items corresponding to those of FIG. 1 are denoted with the same reference numerals.

In the furnace bottom arrangement illustrated in FIG. 2, the bottom 16 runs through the wall 14 so that part 37 of the bottom remains outside the actual furnace 10. By this arrangement the sealing between the wall 14 and the bottom is different from the sealing between wall 12 and the bottom.

Figures 3, 4:
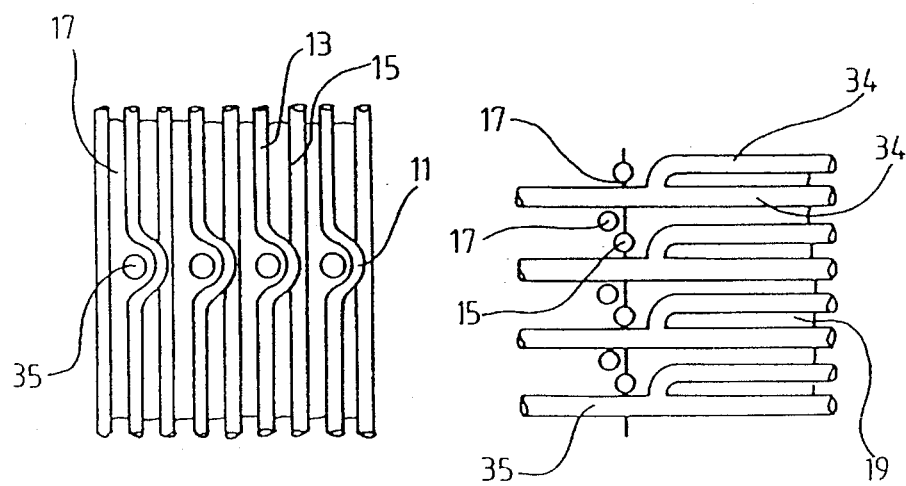
FIG. 3 is an enlargement of a section of FIG. 2 taken along line A—A.
FIG. 4 is an enlargement of a section of FIG. 2 taken along line B—B.

FIGS. 3 and 4 illustrate an enlargement of the junction between wall 14 and bottom 16. FIG. 3 is a side view of the tubes 13 and 15 of the wall 14. Every other wall tube 13 is bent to form a bend 11, which makes it possible for the bottom tubes 35 to run through the wall. FIG. 3 also shows the fins 17 between the wall tubes.

FIG. 4 illustrates the same junction between wall 14 and bottom 16, but seen from below. The Figure shows that the tubes 34 of the bottom 16 are combined in pairs to form tubes 35. Tubes 35 run between the wall tubes 13 and 15 to the outside of the furnace. FIG. 4 also shows the fins 19 between the bottom tubes.

In the arrangement according to FIG. 2, cooling of the bottom is effected by air, which is supplied heated from pipe 42 via pipe 43 to the primary air inlets of the furnace. In this way, air used for cooling of the bottom may be directly used in the actual combustion process.

Figure 5:
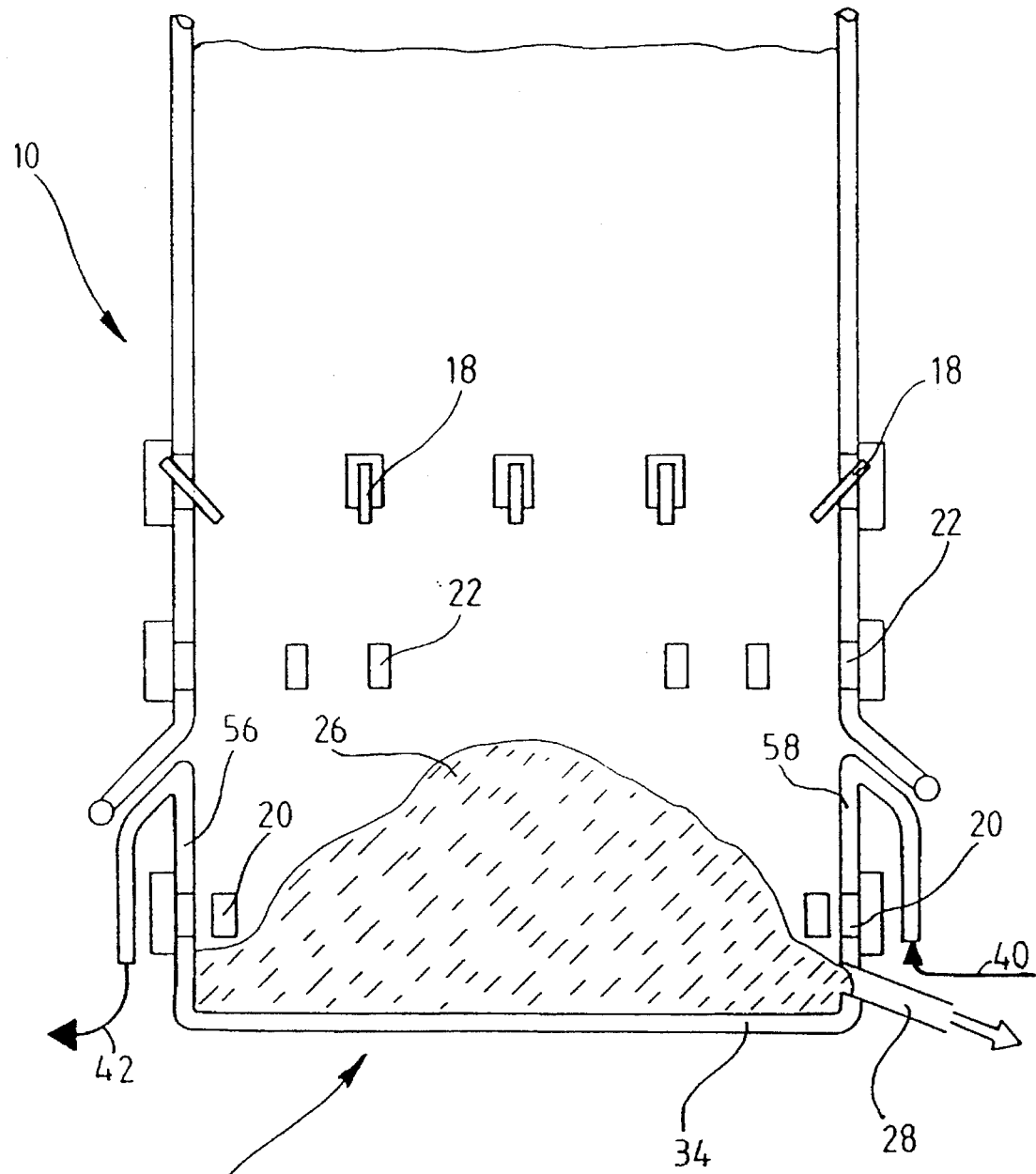
FIG. 5 is a schematic vertical section of a third bottom arrangement according to the invention.

FIG. 5 illustrates a furnace arrangement, where part of the furnace wall is connected to a separate cooling circulation system. The tubes 34 forming the furnace bottom 16 are bent upwardly near the wall so that they form the walls 56 and 58 of the lower section of the furnace. Tube 56 is connected to the cooling medium supply pipe 40 and tube 58 to the discharge pipe 42. This arrangement improves the safety of the whole lower section of the furnace. In the arrangement according to FIG. 5, separate cooling extends to the same level as the bed height. Naturally, it is possible to extend the separate cooling circulation still higher if it is profitable in terms of energy economy.

It is not an intention to limit the invention to the embodiments described hereinabove, but it may be applied within the inventive scope defined by the accompanying claims. Thus, for example, the cross-sectional shape of the furnace does in no way limit the implementation of the invention. The cross section of the furnace may be, for example, conventionally square or rectangular, but it may as well be round, elliptic or in some other shape.

The bottom tube configuration of the furnace may also be freely chosen. The bottom tubes need not be parallel with the walls, but they may also run diagonally. The bottom tubes may also be bent so as to form a bend on the furnace bottom. The cooling medium may flow in the opposite directions in different tubes.

I claim:

1. A method for improving the safety of a spent liquor recovery boiler having a furnace for recovering chemicals and energy, cooled by cooling tubes and connected to a water/steam circulation for recovering energy from the boiler, the furnace having a bottom portion and sidewalls, comprising the steps of:

(a) cooling the furnace sidewalls by passing a cooling fluid through a first cooling circulation including the cooling tubes connected to the water/steam circulation of the boiler; and (b) cooling the bottom portion of the furnace separately from the sidewalls, using a separate and distinct second cooling circulation, and passing a cooling fluid through the second cooling circulation; and wherein the second cooling circulation is not in communication with the boiler waste/steam circulation.

2. A method as recited in claim 1 wherein air or an inert gas is the cooling fluid in the second cooling circulation.

3. A method as recited in claim 2 comprising the further step (c) of supplying the air from step (b), after it has been used to cool the furnace bottom portion and has been heated, as combustion air to the furnace.

4. A method as recited in claim 1 comprising the further step (c) of using the cooling fluid from step (b), after it has cooled the bottom portion of the furnace and has been heated, for preheating combustion air supplied to the furnace.

5. A method as recited in claim 1 wherein the cooling fluid in the second cooling circulation is a metal, that is molten at the temperature of the bottom portion of the furnace, which will not cause an explosion if the molten metal contacts chemicals in the furnace.

6. A method as recited in claim 1 wherein the bottom portion is substantially horizontal and substantially planar, and wherein step (b) is practiced to pass the cooling fluid substantially horizontally through the bottom portion.

7. A method as recited in claim 1 comprising the further step of: (c) establishing a bed of spent liquor pyrolysis waste supported by the bottom portion of the furnace, having a predetermined height, and passing chemical melt formed within the furnace out of the furnace adjacent the bottom portion; and wherein the bottom portion includes a substantially horizontal planar first part, and a second part extending upwardly from the first part a distance approximately equal to the height of the bed maintained in the practice of step (c) and at least on opposite sides of the first part; and wherein step (b) is practiced by circulating the cooling fluid through both the first and second parts of the bottom portion.

8. A method as recited in claim 1 comprising the further step of (c) recovering heat from the cooling fluid circulated in step (b) by connecting it up to a cooler separate and distinct from the circulation provided in the practice of step (a).

9. A method as recited in claim 8 comprising the further step (d) of maintaining the temperature of the cooling fluid used for introduction into the second cooling circulation substantially constant by controlling the cooler used in the practice of step (c).

10. A method as recited in claim 1 comprising the further step of burning spent liquor from sulfur based pulp manufacturing processes in the furnace which generates the chemicals and energy that are recovered.

11. A spent liquor recovery boiler for the pulp industry, comprising:

a furnace for recovering chemicals and energy from spent liquor combusted therein;

a water/steam circulation system;

said furnace having a first cooling circulation comprising sidewalls cooled by first cooling tubes connected to said water/system circulation system, and having a cooling fluid circulating therethrough;

a bottom portion of said furnace;

a chemical melt withdrawal conduit for withdrawing chemical melt from the furnace adjacent said bottom portion; and a second cooling means defining said bottom portion of said furnace and connected up to a second cooling circulation that is separate and distinct from said first cooling circulation, a cooling fluid circulated through said second cooling circulation including said furnace bottom portion, for cooling said bottom of said furnace, said second cooling circulation not in communication with said water/steam circulation system.

12. Apparatus as recited in claim 11 wherein air or inert gas is disposed in said second cooling circulation and is the cooling fluid therein.

13. Apparatus as recited in claim 11 wherein said cooling fluid in said second cooling circulation is a liquid which will not cause an explosion if the liquid contacts chemicals in said furnace.

14. Apparatus as recited in claim 13 wherein said cooling liquid is molten zinc.

15. Apparatus as recited in claim 11 wherein said bottom portion comprises a substantially planar horizontal first part, and a second part extending upwardly from said first part on opposite sides thereof.

16. Apparatus as recited in claim 15 wherein opposite end portions of said second part are connected to a supply pipe for said cooling fluid and a discharge pipe for heated cooling fluid.

17. Apparatus as recited in claim 11 further comprising a cooler connected to said second cooling circulation, said cooler being independent and distinct from said first cooling circulation.

18. Apparatus as recited in claim 11 wherein said bottom portion is formed by tubes disposed in side-by-side relationship.

19. A spent liquor recovery boiler for the pulp industry, comprising:

a furnace for recovering chemicals and energy from spent liquor combusted therein;

a water/steam circulation system;

said furnace having a first cooling circulation comprising sidewalls cooled by first cooling tribes and a cooling fluid circulating therethrough, said first cooling circulation not in communication with said water/steam circulation system for said boiler;

a bottom portion of said furnace;

a chemical melt withdrawal conduit for withdrawing chemical melt from the furnace adjacent said bottom portion; and a second cooling means defining said bottom portion of said furnace and connected up to a second cooling circulation that is separate and distinct from said first cooling circulation, a cooling fluid circulated through said second cooling circulation including said furnace bottom portion, for cooling said bottom of said furnace, said second cooling circulation not in communication with said water/steam circulation system.

20. Apparatus as recited in claim 19 wherein said cooling fluid in said second cooling circulation is a molten metal which will not cause an explosion if the liquid contacts chemicals in said furnace.

* * * * *